United States Patent Office
2,751,408
Patented June 19, 1956

2,751,408

TREATMENT OF PROTEIN HYDROLYSATES

Forest A. Hoglan, Glenview, and Preston A. Pugh, Jr., Skokie, Ill., assignors to International Minerals & Chemical Corporation, a corporation of New York No Drawing. Application August 5, 1952,
Serial No. 302,802

15 Claims. (Cl. 260—519)

The present invention relates to a method for the recovery of tyrosine from protein hydrolysates. More particularly, it relates to a method for the separation of tyrosine from protein hydrolysates which contain humin.

Conventional methods for tyrosine removal and recovery from protein hydrolysates involve adjusting the pH of the hydrolysate to a point near the isoelectric point of tyrosine, separating humin from the adjusted hydrolysate, for example by filtration, concentrating the resulting filtrate, and separating from the solution a precipitate containing tyrosine, leucine, isoleucine, humin and inorganic salts. For example, in the Shildneck patent, U. S. 2,347,220, protein is hydrolyzed with a mineral acid, such as hydrochloric acid, and the hydrolysate is diluted and neutralized to a pH of about 4.5. Humin is separated from the adjusted hydrolysate, and the solution from which the humin has been separated is concentrated, cooled and seeded with tyrosine and leucine in order to crystallize these amino acids from the hydrolysate. Glutamic acid is recovered from the solution from which the tyrosine and leucine have been separated.

This tyrosine-leucine mixture generally contains between about 6% and about 10% tyrosine, and due to the relatively low tyrosine content, to recover pure tyrosine from this precipitate would require the processing of large amounts of the crude mixture. The tyrosine present in the mixture is about one-third of the tyrosine originally present in the hydrolysate. About one-third of the tyrosine is generally lost in the humin cake. Recently tyrosine is being employed for new uses, such as in pharmaceuticals, and it has been desirable to reduce the amount of tyrosine lost in the humin and to obtain mixtures containing a higher proportion of tyrosine which are adaptable to further processing for recovery of pure tyrosine.

It is an object of the instant invention to provide a process for the recovery of tyrosine-containing mixtures from protein hydrolysates, said mixtures having a higher tyrosine content than has heretofore been attained.

It is a further object of the instant invention to provide a method for the initial separation from protein hydrolysates of tyrosine-containing mixtures generally having a tyrosine content of between about 25% and about 50%.

It is a further object of the instant invention to provide a method for the more efficient recovery of tyrosine from protein hydrolysates by reducing the amount of tyrosine lost with humin.

These and other objects of the instant invention will become apparent upon a fuller understanding of the invention as hereinafter set forth.

The instant invention involves separating a crude tyrosine-containing mixture of relatively high tyrosine content from protein hydrolysates from which humin has been previously removed at a lower pH. More specifically, the humin is separated at a pH between about 0.5 and about 4.0 and at a temperature between about 40° C. and about 100° C. The solution from which the humin has been separated is then adjusted to a pH between about 5.5 and about 10.0. The tyrosine is crystallized from the resulting solution and is separated from the solution by any convenient method, such as by filtration or centrifugation.

In one embodiment of the instant invention protein is hydrolyzed with a mineral acid nonoxidizing under the conditions obtaining and the pH of the hydrolysate is adjusted to between about 0.5 and about 4.0 and is heated to a temperature between about 40° C. and about 100° C. Humin is separated from the hot hydrolysate. The solution from which the humin has been separated is then adjusted, using a suitable alkali, to a pH between about 5.5 and about 10.0. The tyrosine is allowed to crystallize from the resulting solution and is separated from the solution by any convenient method, such as by filtration or centrifugation.

In a specific embodiment of the instant invention, cereal gluten such as wheat gluten or corn gluten, which has been hydrolyzed with mineral acid, nonoxidizing under the conditions obtaining, such as hydrochloric acid or sulfuric acid is mixed with sufficient alkali such as sodium hydroxide to produce a pH between about 0.5 and about 4.0. The adjusted hydrolysate is heated to a temperature between about 40° C. and about 100° C., and humin is separated from the hot hydrolysate by any convenient method. The solution from which the humin has been separated is mixed with additional alkali such as sodium hydroxide to produce a pH of between about 5.5 and about 10.0. Tyrosine is allowed to crystallize from the resulting solution without resort to prior concentration of the solution. Although in practicing the instant process, the pH of the solution can be adjusted and tyrosine crystallized from a solution having a pH between about 5.5 and about 10.0, a pH between about 5.5 and about 6.5 which is near the isoelectric point of tyrosine is preferred. Tyrosine crystallizes from the resulting solution upon cooling to about atmospheric temperature. The solution from which tyrosine is crystallized may be agitated or stirred if desired (but not necessarily) for at least about eight hours, preferably about eight and about sixteen hours, at about atmospheric temperature, and the tyrosine-containing solids which have precipitated from the solution, are separated therefrom by any convenient method, such as by filtration. The tyrosine mixture contains up to about 69% of the tyrosine initially present in the hydrolysate. When the resulting liquor is concentrated, an additional amount of tyrosine precipitates from the liquor and a total of between about 80% and about 85% of the tyrosine initially present in the hydrolysate is recovered.

In conventional processing of hydrochloric acid hydrolysates in which both humin and tyrosine are separated at a pH of between about 4.5 and about 6.5, about 36% of the original tyrosine is found in the humin cake and only about 33% of the tyrosine is separated in the tyrosine mixture. In the instant novel process, the tyrosine which is present and which would normally be retained in the humin cake is separated more completely from this humin residue and is ultimately recovered in the tyrosine mixture. It has been discovered that by separating humin as herein described at a pH between about 0.5 and about 4.0, and separating tyrosine at a higher pH, that is preferably between about 5.5 and about 6.5, tyrosine loss in the humin is minimized. When tyrosine is crystallized at a pH lower than about 5.5, tyrosine crystallization is incomplete and reduces the recovery of tyrosine. When humin is separated at a pH near the isoelectric point of tyrosine, significant amounts of tyrosine precipitate with and are lost in the humin cake. It has been found that tyrosine recoveries can be greatly improved by separating the tyrosine and the humin at different pH's as herein described.

In a preferred embodiment of the instant invention, a cereal gluten hydrolysate produced by acid hydrolysis of gluten is mixed with sufficient alkali metal hydroxide, for example sodium hydroxide, to adjust the pH to between about 0.5 and about 4.0. The adjusted mixture is heated to a temperature between about 40° C. and about 100° C., and the humin is removed from the heated mixture by any convenient method, such as by filtration. Alkali metal hydroxide, such as sodium hydroxide is added to the resulting unconcentrated solution in sufficient amount to produce preferably a pH of between about 5.5 and about 6.5, and the resulting solution is cooled to about atmospheric temperature and is allowed to stand for at least about eight hours. The tyrosine mixture which precipitates is removed, for example by filtration. If desired, glutamic acid can be recovered in any conventional manner from the hydrolysate, for example by adjusting the pH of the solution from which tyrosine has been removed to about 3.2 and crystallizing glutamic acid therefrom.

Although in practicing the instant invention, humin may be removed at any pH between about 0.5 and about 4.0, if it is desired to recover glutamic acid from the hydrolysate in addition to the tyrosine, the humin is preferably not removed at a pH sufficiently near the isoelectric point of glutamic acid (pH 3.2) to cause crystallization and loss of glutamic acid in the humin cake. However, if it is not desired to recover glutamic acid from the hydrolysate, any pH between about 0.5 and about 4.0 may be employed. If desired, a small amount of filter aid, tannin, or tannic acid may be added to the hydrolysate in order to facilitate the separation of the humin from the hydrolysate. The humin is separated from the hydrolysate at an elevated temperature in order to minimize co-precipitation of any amino acids with the humin. Although any temperature between about 40° C. and about 100° C. may be maintained during the separation of the humin, a temperature above about 60° C. is preferably employed.

The tyrosine-containing mixture is allowed to precipitate from the unconcentrated solution from which the humin has been removed and which has been further neutralized with alkali. The tyrosine mixture precipitates upon standing or stirring at about atmospheric temperature. It is preferred to allow the mixture to stand or to stir the mixture for about sixteen hours to permit maximum tyrosine precipitation to occur. The precipitate is separated from the hydrolysate by any convenient method and is dried. The solution from which the tyrosine has been separated may be concentrated and additional amounts of tyrosine crystallized from the solution.

Substantially pure tyrosine can be recovered from the tyrosine-containing mixtures separated in accordance with the instant novel process by any convenient method, for example, by the method described and claimed in copending application Serial No. 267,000, filed January 17, 1952, which involves dissolving tyrosine, leucine and cystine from the tyrosine-containing mixture with aqueous hydrochloric acid at a pH between about 0.5 and about 2.0 at an elevated temperature. The resulting hot solution is decolorized and solid material is separated, for example by filtration. The filtrate is adjusted to a pH between about 2.0 and about 3.5 and a tyrosine-cystine mixture crystallizes therefrom. Sufficient aqueous ammonium hydroxide is added to the tyrosine-cystine mixture to produce a pH of about 10.8. Cystine dissolves, and solid tyrosine is separated from the solution by any convenient method, such as by filtration.

In another embodiment of the instant invention, tyrosine is recovered from cereal gluten which has been hydrolyzed with sulfuric acid. When sulfuric acid is used as the hydrolyzing acid, it is preferred for subsequent recovery of other values to employ ammonium hydroxide rather than sodium hydroxide for the pH adjustments, although sodium hydroxide is useful as far as tyrosine recovery is concerned. The hydrolysate is adjusted to a pH between about 0.5 and about 4.0 with ammonium hydroxide and is heated to a temperature between about 40° C. and about 100° C. Humin is separated from the hot mixture by any convenient method. The resulting solution from which humin has been separated is adjusted to a pH between about 5.5 and about 6.5 with ammonium hydroxide, and the adjusted solution is cooled to about atmospheric temperature and stirred or allowed to stand for between about eight and about sixteen hours to allow the tyrosine-containing mixture to precipitate. The tyrosine mixture is separated from the solution which is then concentrated and additional tyrosine crystallized therefrom by allowing the concentrated cooled solution to stand for between about eight and about sixteen hours. Glutamic acid may be recovered from the solution from which the tyrosine mixtures have been separated by adjusting the pH to between about 2.5 and about 3.5, preferably about 3.2 and allowing glutamic acid to crystallize from the resulting solution. When glutamic acid is to be recovered from the solution from which tyrosine has been separated, by adjusting to a pH of about 3.2, it is preferred to employ a pH of between about 0.5 and about 2.0 for the separation of humin.

The instant process is applicable to tyrosine-containing hydrolysates of any proteinaceous material in which insoluble humin normally is formed. The acidic hydrolysates prepared from crude proteins including corn gluten, wheat gluten, cottonseed meal, flaxseed meal, soybean meal, peanut meal, casein, albumin, zein, wool, silk and the like all contain tyrosine and produce substantial quantities of insoluble humin, and the improved process of recovering tyrosine in higher yields is best used in such processes.

The following examples are presented in order to afford a clearer understanding of the practice of the instant invention, but it is to be distinctly understood that these examples are illustrative only, and that there is no intention to limit the invention thereto.

*Example I*

About 200 grams of wheat gluten hydrolysate, which contained about 56 grams protein equivalent and about 1.78 grams of tyrosine, was prepared by refluxing about 67 grams of wheat gluten at about 105° C. for about sixteen hours with about 133 grams of 26% aqueous hydrochloric acid. The hydrolysate was neutralized to a pH of about 4 with about 50% aqueous sodium hydroxide solution, and the humin was removed by filtration of the solution while the solution was hot (65° C.). The filtrate was adjusted to a pH of about 6.0 with a solution of about 50% aqueous sodium hydroxide. The adjusted solution was stirred slowly for about sixteen hours at about atmospheric temperature to permit precipitation of tyrosine which was then filtered from the solution. The precipitate was dried and weighed about 4.16 grams. The dried mixture contained about 29.4% tyrosine. The recovery was about 68.7% based on that originally contained in the acid hydrolysate.

When a tyrosine-containing mixture is separated from about 200 grams of hydrochloric acid-hydrolyzed wheat gluten in the conventional manner, that is by the filtration of the humin from the hydrolysate at a pH between about 5.5 and about 6.5, concentration of the resulting solution to crystallize inorganic salts, and precipitating from the resulting solution a tyrosine-containing mixture, the mixture separated generally contains only about 6% to about 10% tyrosine, and the recovery of tyrosine from the wheat gluten is about 33% based on that originally contained in the acid hydrolysate.

*Example II*

About 300 grams of corn gluten hydrolysate which contained about 73 grams protein equivalent and about 3.88 grams of tyrosine was prepared by refluxing about 100 grams of corn gluten at about 105° C. with about 200 grams of aqueous hydrochloric acid for about sixteen hours and was neutralized to a pH of about 4 with an about 50% aqueous sodium hydroxide solution. The humin was removed by filtration of the solution while the solution is hot (60° C.). The filtrate was adjusted to a pH of about 6.0 with a solution of about 50% aqueous sodium hydroxide. The adjusted solution without concentration was stirred slowly for about sixteen hours at atmospheric temperature to permit precipitation of tyrosine which was then filtered from the liquor. The precipitate was dried and weighed about 5.49 grams. The dried mixture contained about 43.5% tyrosine, the remainder being largely leucine. The recovery of tyrosine in this precipitate was about 61.7% based on that originally contained in the hydrolysate. The liquor from which the tyrosine-containing precipitate had been removed was concentrated, and additional tyrosine which precipitated was filtered from the liquor. When this precipitate was combined with the former tyrosine-containing precipitate, a total of about 74.1% of the tyrosine initially present in the hydrolysate was recovered.

Having thus fully described and illustrated the character of the instant invention, what is desired to be secured and claimed by Letters Patent is:

1. A process for the treatment of protein hydrolysates which comprises hydrolyzing protein with a mineral acid nonoxidizing under the conditions obtaining, separating humin from the hydrolysate at a pH between about 0.5 and about 4.0 and at a temperature between about 40° C. and about 100° C., adjusting the pH of the humin-free hydrolysate to between about 5.5 and about 10.0 and precipitating tyrosine-containing material from the adjusted solution.

2. A process for the treatment of protein hydrolysates which comprises hydrolyzing protein with a mineral acid non-oxidizing under the conditions obtaining, separating humin from the hydrolysate at a pH between about 0.5 and about 4.0 and at a temperature between about 40° C. and about 100° C., adjusting the pH of the humin-free hydrolysates to between about 5.5 and about 6.5 precipitating tyrosine-containing material from the resulting solution at about atmospheric temperature, and separating the tyrosine-containing precipitate therefrom.

3. A process for the treatment of protein hydrolysates which comprises hydrolyzing protein with a mineral acid non-oxidizing under the conditions obtaining, separating humin from the hydrolysate at a pH between about 0.5 and about 4.0 and at a temperature between about 60° C. and about 100° C., adjusting the pH of the humin-free hydrolysate to between about 5.5 and about 10.0, precipitating tyrosine-containing material from the resulting solution at about atmospheric temperature, and separating the tyrosine-containing precipitate therefrom.

4. A process for the treatment of protein hydrolysates which comprises hydrolyzing protein with a mineral acid non-oxidizing under the conditions obtaining, separating humin from the hydrolysate at a pH between about 0.5 and about 4.0 and at a temperature between about 40° C. and about 100° C., adjusting the pH of the humin-free hydrolysate to between about 5.5 and about 10.0, precipitating tyrosine-containing material from the resulting solution at about atmospheric temperature without concentration of the solution, separating the tyrosine-containing precipitate therefrom, concentrating the resulting solution, and separating additional tyrosine-containing precipitate therefrom.

5. A process for the treatment of protein hydrolysates which comprises hydrolyzing protein with hydrochloric acid, separating humin from the hydrolysate at a pH between about 0.5 and about 4.0 and at a temperature between about 40° C. and about 100° C., adjusting the pH of the humin-free hydrolysate to between about 5.5 and about 10.0, precipitating tyrosine-containing material from the resulting solution at about atmospheric temperature, and separating the tyrosine-containing precipitate therefrom.

6. A process for the treatment of protein hydrolysates which comprises hydrolyzing protein with hydrochloric acid, separating humin from the hydrolysate at a pH between about 0.5 and about 4.0 at a temperature between about 40° C. and about 100° C., adjusting the pH of the humin-free hydrolysate to between about 5.5 and about 6.5, precipitating tyrosine-containing material from the resulting solution at about atmospheric temperature, and separating tyrosine-containing precipitate therefrom.

7. A process for the treatment of protein hydrolysates which comprises hydrolyzing a cereal gluten with hydrochloric acid, separating humin from the hydrolysate at a pH between about 0.5 and about 4.0 and at a temperature between about 40° C.. and about 100° C., adjusting the pH of the humin-free hydrolysate to between about 5.5 and about 10.0 with alkali, precipitating tyrosine-containing material from the resulting solution at about atmospheric temperature, and separating the tyrosine-containing precipitate therefrom.

8. A process for the treatment of protein hydrolysates which comprises hydrolyzing a cereal gluten with sulfuric acid, separating humin from the hydrolysate at a pH between about 0.5 and about 4.0 while maintaining the temperature between about 40° C. and about 100° C., adjusting the pH of the humin-free hydrolysate to a pH between about 5.5 and about 10.0, precipitating tyrosine from the resulting solution at about atmospheric temperature, and separating the tyrosin-containing precipitate therefrom.

9. A process for the treatment of protein hydrolysates which comprises separating humin from the protein hydrolysate at a pH between about 0.5 and about 4.0 while maintaining the temperature between about 60° C. and about 100° C., adjusting the pH of the humin-free hydrolysate to between about 5.5 and about 10.0, maintaining the resulting mixture at least about eight hours at about atmospheric temperature, and separating a tyrosine-containing precipitate from the resulting mixture.

10. A process for the treatment of cereal gluten hydrolysate which comprises hydrolyzing said gluten with hydrochloric acid, separating humin from the hydrolysate at a pH between about 0.5 and about 4.0 while maintaining the temperature of the hydrolysate between about 60° C. and about 100° C., adjusting the pH of the humin-free hydrolysate to between about 5.5 and about 6.5, agitating the solution from which the humin has been removed for at least about eight hours at about atmospheric temperature, and separating a tyrosine-containing precipitate from the resulting mixture.

11. A process for the treatment of cereal gluten hydrolysate which comprises hydrolyzing said gluten with hydrochloric acid, separating humin from the hydrolysate at a pH between about 0.5 and about 4.0 while maintaining the temperature of the hydrolysate between about 60° C. and about 100° C., adjusting the pH of the humin-free hydrolysate to between about 5.5 and about 6.5, agitating the solution from which the humin has been removed for at least about eight hours at about atmospheric temperature, and separating a tyrosine-containing precipitate from the resulting mixture, concentrating the resulting solution, and separating additional tyrosine-containing precipitate therefrom.

12. A process for the treatment of gluten hydrolysate which comprises adjusting the pH of hydrochloric acid-hydrolyzed gluten to a pH between about 0.5 and about 4.0, separating humin from the resulting hydrolysate, while maintaining the temperature of the hydrolysate between about 40° C. and about 100° C., adjusting the pH of the humin-free hydrolysate to between about 5.5 and about 6.5 with caustic soda, precipitating tyrosine-containing material from the resulting solution over a period of between about eight and about sixteen hours at about atmospheric temperature, and separating tyrosine-containing precipitate from the resulting mixture.

13. A process for the treatment of gluten hydrolysate which comprises separating humin from said hydrolysate at a pH between about 0.5 and about 4.0, while maintaining the temperature of the hydrolysate between about 40° C. and about 100° C., adjusting the pH of the humin-free hydrolysate to between about 5.5 and about 10.0, precipitating tyrosine-containing material from the resulting solution over a period of between about eight and about sixteen hours at about atmospheric temperature, separating tyrosine-containing precipitate from the resulting mixture, adjusting the pH of the solution from which tyrosine material has been separated to between about 3.0 and about 3.3, and recovering glutamic acid precipitate therefrom.

14. A process for the treatment of gluten hydrolysate which comprises separating humin from said hydrolysate at a pH between about 0.5 and about 4.0, while maintaining the temperature of the hydrolysate between about 60° C. and about 100° C., adjusting the pH of the humin-free hydrolysate to between about 5.5 and about 6.5, precipitating tyrosine-containing material from the resulting solution over a period between about eight and about sixteen hours at about atmospheric temperature, separating the tyrosine-containing precipitate from the resulting mixture, adjusting the pH of the solution from which tyrosine material has been separated to between about 3.0 and about 3.3 and recovering glutamic acid precipitate therefrom.

15. A process for the treatment of gluten hydrolysate which comprises separating humin from said hydrolysate at a pH between about 0.5 and about 4.0, while maintaining the temperature of the hydrolysate between about 60° C. and about 100° C., adjusting the pH of the humin-free hydrolysate to between about 5.5 and about 6.5, precipitating tyrosine-containing material from the resulting solution over a period between about eight and about sixteen hours at about atmospheric temperature, separating the tyrosine-containing precipitate from the resulting mixture, concentrating the resulting solution, and separating additional tyrosine-containing precipitate therefrom.

References Cited in the file of this patent

UNITED STATES PATENTS

| | | |
|---|---|---|
| 1,990,769 | Barnett | Feb. 12, 1935 |
| 1,992,462 | Barnett | Feb. 26, 1935 |
| 2,194,302 | Gerber | Mar. 19, 1940 |
| 2,444,577 | Murata | July 6, 1948 |
| 2,463,877 | Hoglan | Mar. 8, 1949 |

FOREIGN PATENTS

| | | |
|---|---|---|
| 1,013,494 | France | Apr. 30, 1952 |

OTHER REFERENCES

Barnett: J. Biol. Chem., vol. 100, page 548 (1933).